(12) United States Patent
Odamura

(10) Patent No.: US 7,487,042 B2
(45) Date of Patent: Feb. 3, 2009

(54) PORTABLE COMMUNICATION TERMINAL EQUIPPED WITH NAVIGATION FUNCTION AND NAVIGATION METHOD OF PORTABLE COMMUNICATION TERMINAL

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 317 days.

(21) Appl. No.: 11/086,748

(22) Filed: Mar. 23, 2005

(65) Prior Publication Data

US 2005/0222767 A1 Oct. 6, 2005

(30) Foreign Application Priority Data

Mar. 31, 2004 (JP) ............................. 2004-106671

(51) Int. Cl.
*G01C 21/34* (2006.01)
(52) U.S. Cl. ...................................... 701/213; 701/200
(58) Field of Classification Search ......... 701/200–202, 701/208, 211, 212–215, 23–25; 340/988; 342/357.09, 357.1, 357.06, 357.12
See application file for complete search history.

(56) References Cited

U.S. PATENT DOCUMENTS 6,233,523 B1 * 5/2001 Sood .......................... 701/213
6,784,842 B2 * 8/2004 Vesuna ....................... 342/463
6,947,571 B1 * 9/2005 Rhoads et al. .............. 382/100
7,130,742 B2 * 10/2006 Kobuya et al. .............. 701/207
7,174,031 B2 * 2/2007 Rhoads et al. .............. 382/107
2002/0077123 A1 * 6/2002 Otsuka et al. ............... 455/456

FOREIGN PATENT DOCUMENTS

| DE | 198 54 088 A1 | 5/2000 |
| EP | 1033876 A1 * | 9/2000 |
| EP | 1 282 055 A1 | 2/2003 |
| JP | 2003-247840 | 9/2003 |

OTHER PUBLICATIONS

Chinese Office Action dated Mar. 7, 2008 with English translation.
European Search Report dated Feb. 6, 2008.

* cited by examiner

*Primary Examiner*—Yonel Beaulieu
(74) *Attorney, Agent, or Firm*—McGinn IP Law Group, PLLC

(57) ABSTRACT

A cellular phone, including a GPS signal processing means and a camera, performs navigation by use of a display device, the navigation performed through location information detection means for detecting location information from a picture taken by the camera, and GPS signal processing means based on location information detected by the location information detection means. By determining destination information using GPS on the basis of information taken by the camera, or by acquiring destination information and additional information from a server, setting of destination for subsequent navigation is simplified.

10 Claims, 7 Drawing Sheets

MAGAZINE AS EXAMPLE

DESTINATION INFORMATION
PATTERN 2-1

POSTER AS EXAMPLE

DESTINATION INFORMATION
PATTERN 2-2

INFORMATION EXAMPLE 1

| ACQUIRED INFORMATION ||
|---|---|
| 1 | LATITUDE |
| 2 | LONGITUDE |

INFORMATION EXAMPLE 2

| ACQUIRED INFORMATION ||
|---|---|
| 1 | LATITUDE |
| 2 | LONGITUDE |
| 3 | TELEPHONE NUMBER |
| 4 | ADDRESS |
| 5 | MENU |

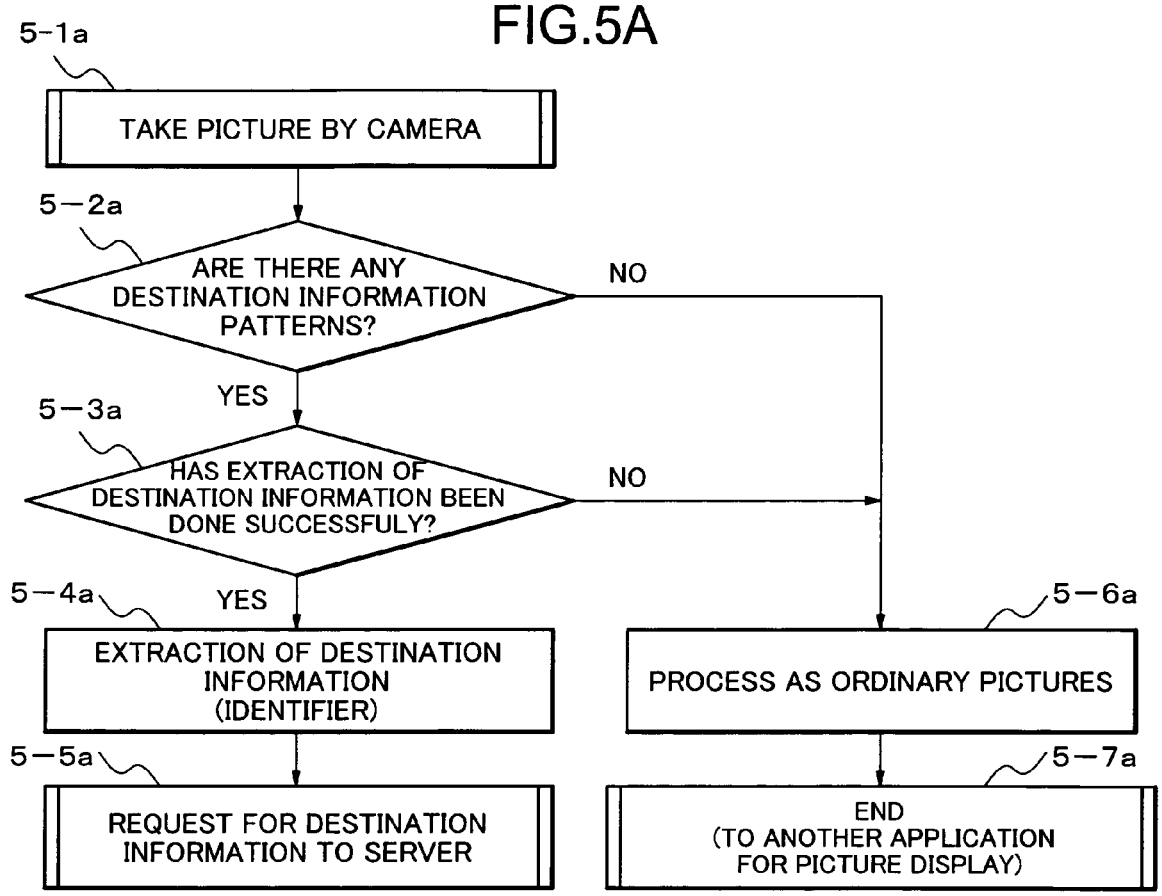
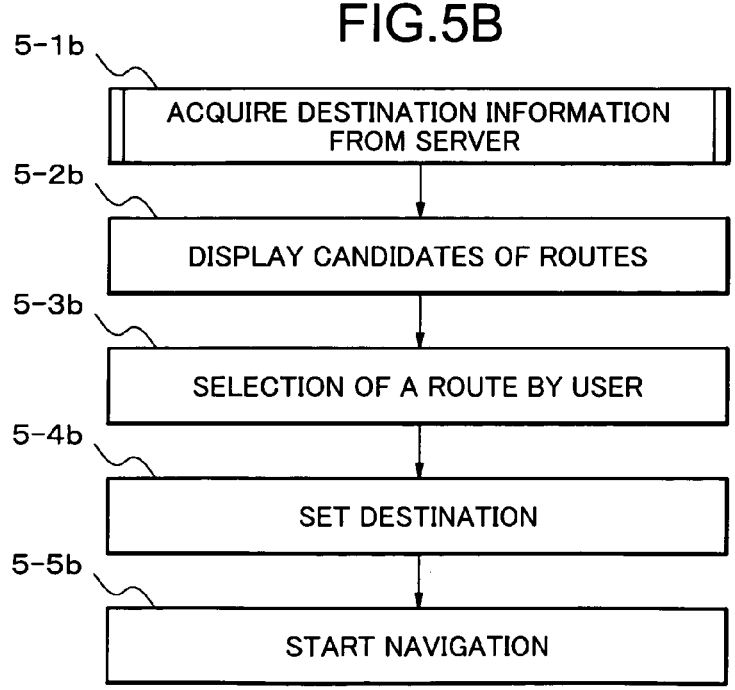

PORTABLE COMMUNICATION TERMINAL EQUIPPED WITH NAVIGATION FUNCTION AND NAVIGATION METHOD OF PORTABLE COMMUNICATION TERMINAL

BACKGROUND OF THE INVENTION

1. Field of the Invention

The present invention relates to a portable communication terminal such as a cellular phone equipped with a camera and, more particularly, to a portable communication terminal such as a cellular phone and a navigation method for a portable communication terminal, which enable a user to perform navigation by setting a destination on the basis of picture information taken by a camera, instead of setting the destination by using an address, a telephone number, or a map displayed on the cellular phone screen.

2. Description of the Related Art

In recent years, a camera function is indispensable for a cellular phone. Most of cellular phones are equipped with a camera.

The technical progress of network assisted GPS (Global Positioning System) and the low power consumption in LSI are remarkable, and have contributed to small size, light weight, and low power consumption of a GPS signal processing circuit or the like. According to this, it has been observed that there is a trend of an increasing number of terminals, operators, and content providers which can provide services on the basis of location information obtained by equipping a cellular phone with a GPS.

As for the network assisted GPS is concerned, there is an MS (Mobile-Station)—Assisted system in which positioning information is inputted from a network at every positioning occasion. Moreover, there is an MS-Based system which can acquire assist information from the network at the initial positioning, and can subsequently operate in a continuous autonomous-positioning mode by its own terminal. The navigation function using a cellular phone becomes provided in full-scale as positioning technologies advance.

There is a technology disclosed relating to arranging a travel route and presenting it to a user's terminal from a server connected to the user's terminal via a network (For example, refer to JP2003-247840A).

However, in the system described in JP2003-247840A, it is necessary to set a location of the destination required when navigation is performed, either through inputting its address or telephone number, or by displaying it on a map downloaded from a map server.

Therefore, it is also necessary to have information of the destination beforehand in order to input an address or a telephone number. Even if with the information already known, it is still necessary to go through many steps such as selections in menus and key inputs in order to input these pieces of information through the cellular phone.

In particular, when setting a destination from the location on the map, it takes a lot of trouble only to find the destination. Besides it is necessary to download the map and thus, unnecessary costs associated with the download to users will be incurred.

SUMMARY OF THE INVENTION

An object of the present invention is to solve the above mentioned problems and provide a portable communication terminal with which setting of a destination is performed by detecting location information by use of a GPS on the basis of picture information taken by a camera, and determining destination information. In addition, it is also part of the object to provide a portable communication terminal with which setting of a destination in navigation is performed easily by acquiring destination information and additional information from a server.

The portable communication terminal according to the present invention is a portable communication terminal equipped with a GPS and a camera. The portable communication terminal includes location information detection means for detecting location information on the basis of a picture taken by the camera, and navigation means for performing navigation through a GPS signal processing means based on the detected location information.

Moreover, the portable communication terminal according to the present invention is a portable communication terminal equipped with a camera. The portable communication terminal includes location information detection means for detecting location information on the basis of a picture taken by the camera, and navigation means for performing navigation through a network based on the detected location information.

Furthermore, a navigation method of a portable communication terminal according to the present invention includes a first step of detecting location information on the basis of a picture taken by a camera, and a second step of performing navigation through GPS signal processing based on the location information detected thereby.

Moreover, a navigation method of a portable communication terminal according to the present invention includes a first step of detecting location information on the basis of a picture taken by a camera, and a second step of performing navigation through a network based on the location information detected thereby.

According to the present invention, in a portable communication terminal such as a cellular phone and the like, destination information is to be determined by use of a GPS on the basis of a picture taken by a camera. Alternatively by acquiring destination information and additional information from a server, setting of a destination in navigation can be performed easily.

BRIEF DESCRIPTION OF THE DRAWINGS

These and other objects, features and advantages of the invention will become more fully apparent from the following detailed description taken in conjunction with accompanying drawings. In the drawings:

FIGS. 5A and 5B are flowcharts for explaining operations of a second embodiment of the present invention;

DETAILED DESCRIPTION OF THE EMBODIMENTS

Hereinafter, each embodiment of the present invention will be described in detail with reference to the drawings.

First Embodiment

Next, an embodiment of the present invention will be described with reference to the drawings.

Figure 1:
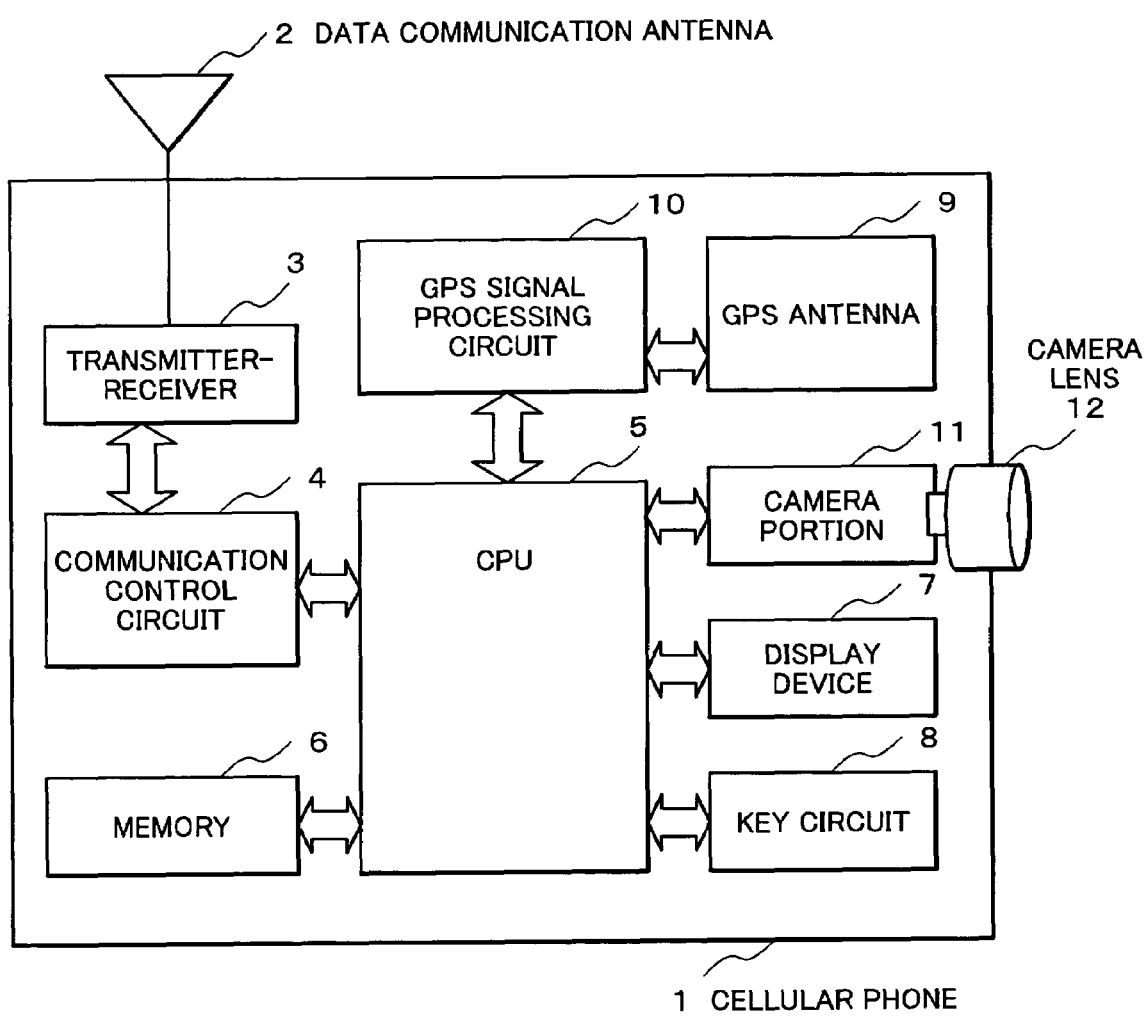
FIG. 1 is a block diagram showing a configuration of a cellular phone of the present invention.

FIG. 1 is a block diagram showing a configuration of a cellular phone of the present invention.

This cellular phone 1 is configured of a data communication antenna 2, a transmitter-receiver 3, a communication control circuit 4, a CPU (Central Processing Unit) 5, and a memory 6.

The data communication antenna 2 is used for data transmission and data reception. The transmitter-receiver 3 performs modulation and demodulation. The communication control circuit 4 controls communication. The CPU 5 controls display, operations by users, and the like. The memory 6 stores transmission and reception data and the like.

Furthermore, the cellular phone is configured of a display device 7, a key circuit 8, a GPS antenna 9, a GPS signal processing circuit 10, a camera portion 11, and a camera lens 12.

The display device 7 displays a picture and the like on a LCD (Liquid Crystal Display). The key circuit 8 performs input operations through dial-keys, switches, and the like. The GPS antenna 9 receives signals from GPS satellites. The GPS signal processing circuit 10 performs the processing of GPS signals. The camera portion 11 and the camera lens 12 take a picture of an object.

The GPS signal processing circuit 10 performs operations in accordance with either an autonomous-positioning system or a network assisted system (hereinafter, abbreviated as A-GPS system). A system based on the autonomous-positioning system performs positioning by demodulating signals of the GPS satellites received through the GPS antenna, and thus acquiring navigation messages by itself outputted from the GSP satellites. On the other hand, a system based on the A-GPS performs positioning by acquiring assist data, equivalent to the navigation messages, from a server on the network.

The CPU 5 extracts a specific pattern such as a barcode from a picture taken by the camera portion 11 by use of some known analysis methods, and also extracts location information out of the pattern.

Figure 2A:
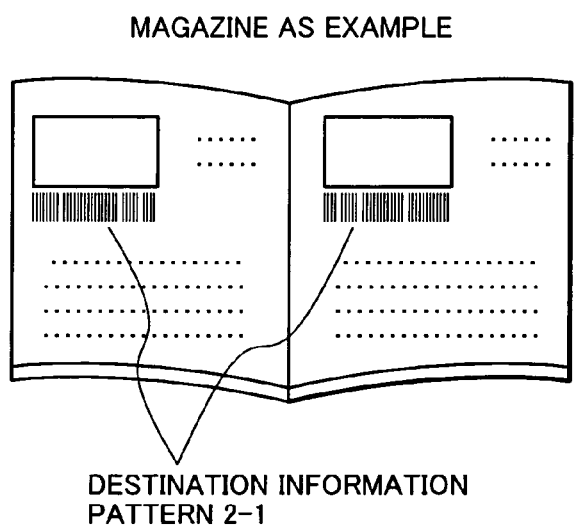
FIGS. 2A and 2B are examples of display including destination information according to the present invention.
Figure 2B:
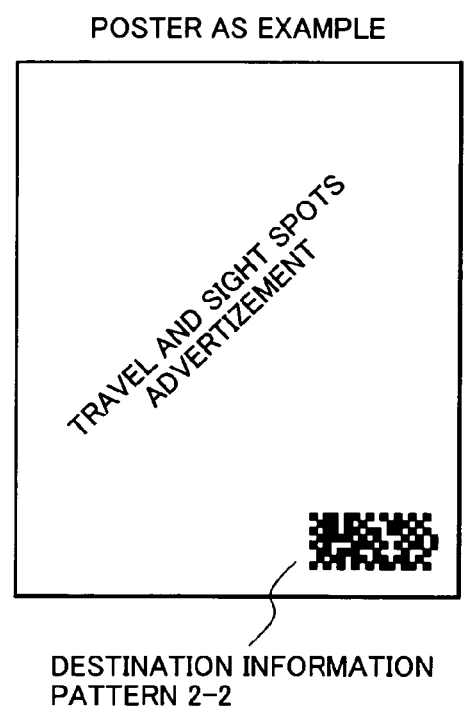

FIGS. 2A and 2B are examples of display including destination information. FIG. 2A shows an example in a magazine and FIG. 2B shows an example in a poster.

As a destination information pattern, for example, one dimensional pattern as shown in FIG. 2A or a two dimensional pattern as shown in FIG. 2B can be used. Of course, a character sequence such as, latitude and longitude, or an address can also be used.

Here, a destination information pattern is generated by coding information specifying a location, such as latitude and longitude, and an address, into one dimensional or two dimensional barcode. In FIGS. 2A and 2B, examples in which latitude and longitude are coded into one dimensional or two dimensional barcode are shown, respectively.

A user of the cellular phone 1 takes a picture of a one dimensional first destination information pattern (2-1) which is shown in FIG. 2A and is a barcode printed on a magazine, such as a restaurant guide and the like. Alternatively the user can take a picture of a two dimensional second destination information pattern (2-2) which is shown in FIG. 2B and is printed on a poster, for instance. Such a poster, which is often seen in railway stations and cities, is ordinarily introducing a travel plan and its resorts for tourists.

Figure 3A:
FIGS. 3A and 3B show the examples of taken pictures of FIGS. 2A and 2B.
Figure 3B:
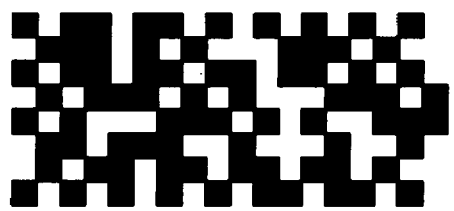

FIGS. 3A and 3B show the examples of taken pictures of FIGS. 2A and 2B respectively. As shown by an information example 1 in FIG. 3A, one dimensional pattern carries a small amount of information including only a latitude and longitude, or an address. As shown by an information example 2 in FIG. 3B, by using two dimensional pattern, it is made possible to acquire additional information, such as a telephone number and a menu of a restaurant, and thus convenience of users will be further improved.

Next, operations in the embodiment of the present invention will be described in detail with reference to FIGS. 1 to 4.

Figure 4:
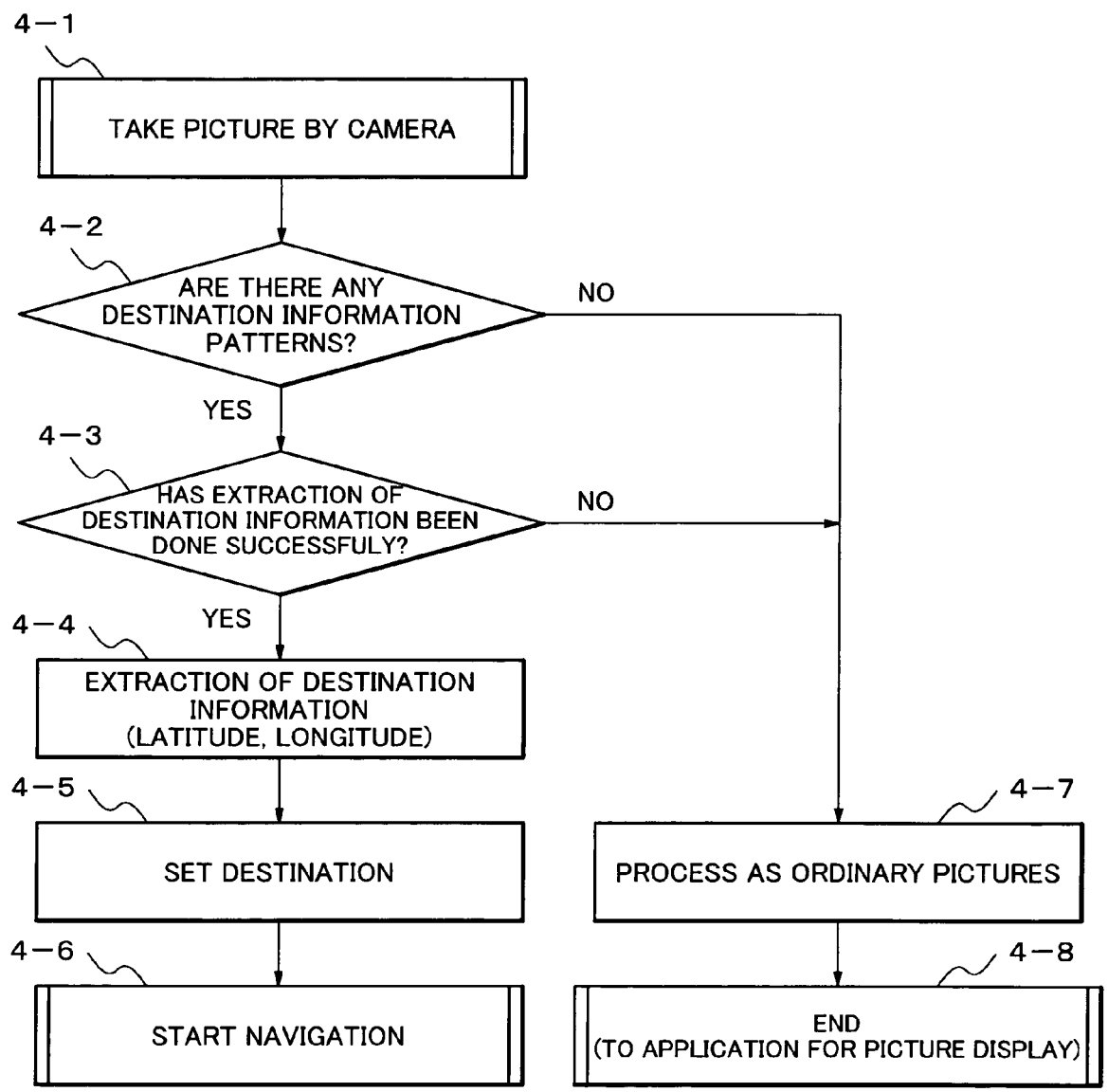
FIG. 4 is a flowchart for explaining operations of a first embodiment of the present invention.

In step 4-1 in FIG. 4, a user of the cellular phone 1 takes a picture of a destination information pattern. To do so, the user starts up a camera portion 11 manipulating a key circuit 8. Following the start up of the camera portion, a CPU 5 displays a picture which can be acquired through a camera lens 12 on a display device 7. The user confirms the destination information pattern (2-1) or (2-2) to be included in the picture frame on the display device 7 through the operation of the key circuit 8 and takes a picture of the destination information pattern.

The CPU 5 stores the taken picture into the memory 6. The CPU 5 determines: whether the destination information pattern exists within the picture frame or not; whether the taken picture includes one of the destination information patterns which may already be stored in the memory 6 or not (step 4-2). As a result of the determination, if a destination information pattern does not exists in the picture frame, the CPU 5 stores the taken picture into the memory 6 as an ordinary picture taken by the camera portion 11 (step 4-7). After storing the picture, the taken picture is displayed on the display device 7, and the processing of taking a picture by the camera portion 11 is terminated (step 4-8).

As a result of the determination, if a destination information pattern exists in the picture, the CPU 5 determines whether an extraction of information (a latitude and longitude, or an address, and so forth) which is necessary for setting the destination is successful or not (step 4-3). As a result of the determination, if a destination information pattern cannot be obtained, the CPU 5 stores the picture into the memory 6 as an ordinary picture taken by the camera portion 11 (step 4-7). After storing the picture, the taken picture is displayed on the display device 7, and the processing of taking a picture by the camera portion 11 is terminated (step 4-8).

As a result of the determination in step 4-3, if the extraction of information which is necessary for the destination setting is successful, destination information, such as a latitude and longitude, is extracted from a pattern coded into one dimensional or two dimensional barcode (step 4-4). The extracted location information of latitude and longitude is set as a latitude and longitude of the destination of the navigation (step 4-5).

Next, the positioning with GPS (A-GPS) is started. The action is followed by a subsequent initiation of navigation by displaying information on the route to a destination and the current location by means of the display device 7 (step 4-6).

With such a configuration, a specific pattern including destination information is taken by a camera incorporated in a cellular phone. By acquiring the information of destination from the picture taken, and setting a destination by use of the destination information, it is made possible to greatly reduce steps for setting a destination.

Second Embodiment

A second embodiment of the present invention will be described with reference to FIG. 1 and FIGS. 5 to 7. In the present embodiment, destination information is acquired from a server through a network by use of a destination information pattern.

FIGS. 5A and 5B show an operation flow of the second embodiment of the present invention.

FIG. 5A shows a sequence of processes from a process of camera shooting till a process of requesting for destination information to a server. FIG. 5B shows a sequence of processes from a process of acquiring the destination information till a process of starting navigation.

A user of the cellular phone 1 takes a picture of a first destination information pattern (2-1) which is printed on a magazine, such as a restaurant guide and the like as shown in FIG. 2A. Alternatively the user can take a picture of a second destination information pattern (2-2) which is printed on a poster, for instance. Such a poster, which is often seen in railway stations and cities, is ordinarily introducing a travel plan and its resorts for tourists. To do so, the user starts up a camera portion 11 manipulating a key circuit 8. Following the start up of the camera portion 11, a CPU 5 displays a picture which can be acquired through a camera lens 12 on a display device 7.

The user confirms the first or second destination information pattern (2-1) or (2-2) to be included in the picture on the display device 7 through the operation of the key circuit 8, and takes a picture of the destination information pattern (step 5-1a in FIG. 5A).

The CPU 5 stores the taken picture into the memory 6. The CPU 5 determines: whether the destination information pattern exists within the picture frame or not; whether the taken picture includes one of the destination information patterns which may already be stored in the memory 6 or not (step 5-2a). As a result of the determination, if a destination information pattern does not exist in the picture frame, the CPU 5 stores the taken picture into the memory 6 as an ordinary picture taken by the camera portion 11 (step 5-6a). After storing the picture, the taken picture is displayed on the display device 7, and the processing of taking a picture in the camera portion 11 is terminated (step 5-7a).

As a result of the determination, if a destination information pattern exists in the picture, the CPU 5 determines whether an extraction of destination information is successful or not (step 5-3a). If the extraction is successful, information on an identifier included in a destination information pattern is acquired. If the extraction is not successful, the picture, as an ordinary picture taken by the camera portion 11, is stored in the memory 6 (step 5-6a). After storing the picture, the picture is displayed on the display device 7, and the processing of taking a picture by the camera portion 11 is terminated (step 5-7a).

Information in this case, which differs from the one obtained in operations shown in FIG. 4, is not necessarily an exact latitude and longitude of the destination, but it can be an identifier such as a sequence of numerals and characters.

As a result of determination by the CPU 5, if information which is necessary for the destination setting is acquired, the destination information is requested from a server with the identifier added (step 5-5a).

Figure 6:
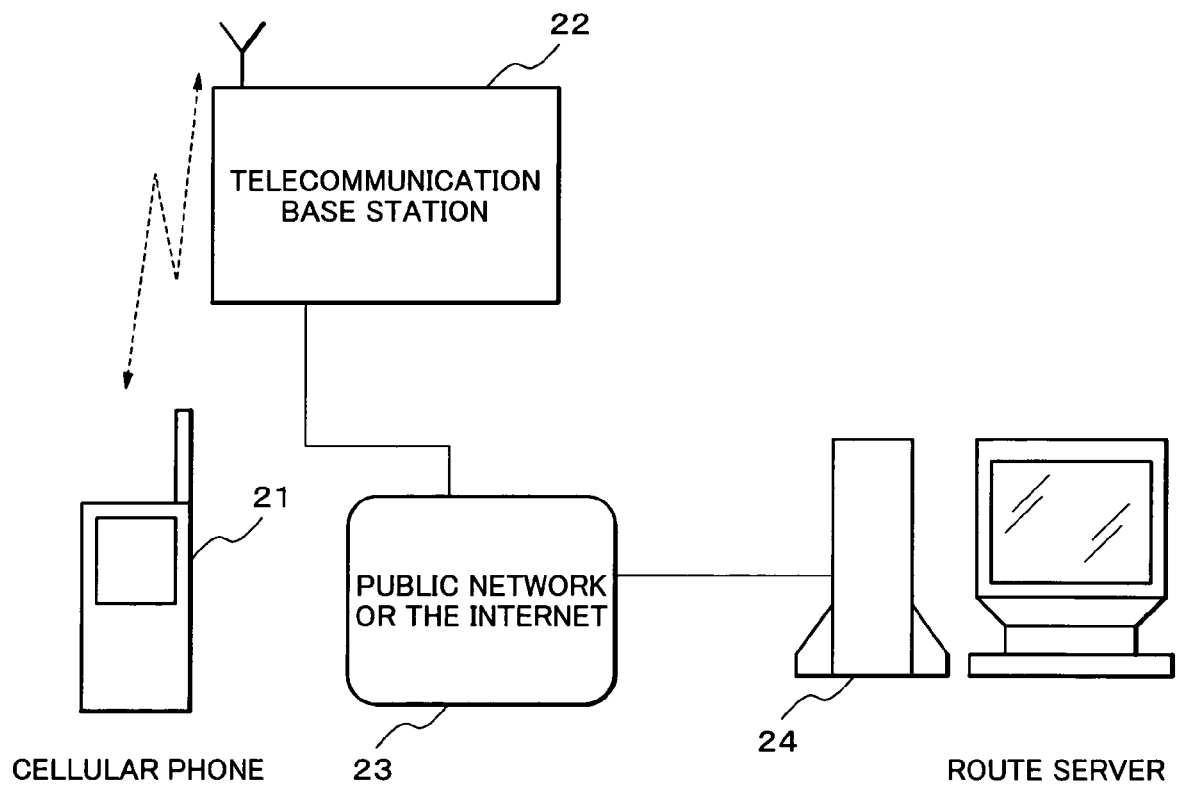
FIG. 6 is a system configuration diagram showing a network configuration of the second embodiment of the present invention.

FIG. 6 is a diagram showing a network configuration of the embodiment.

Figure 7A:
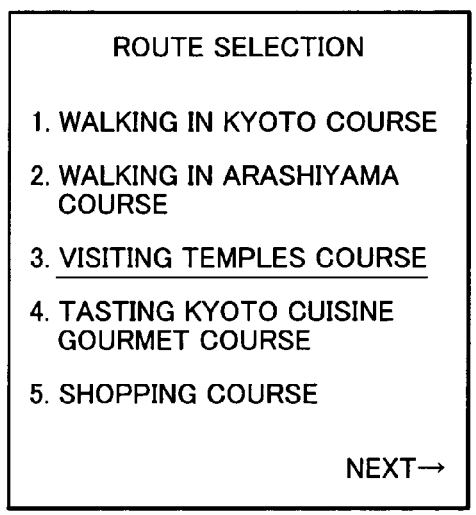
FIGS. 7A and 7B are examples of a screen display and a display list for selection of destinations, respectively, concerning FIGS. 2A and 2B.
Figure 7B:
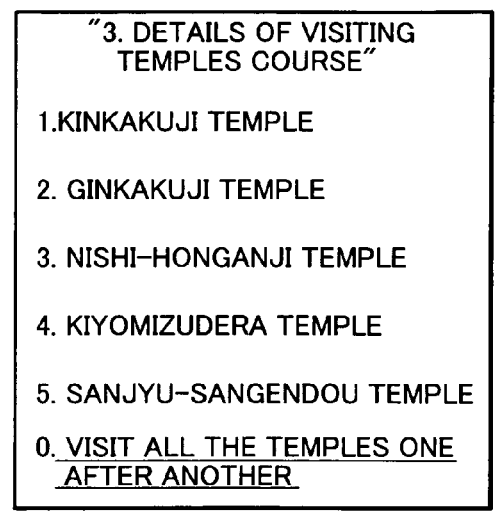

FIGS. 7A and 7B are examples of a display list for selection of destinations. FIG. 7A shows a route selection and FIG. 7B shows the details of the selected route.

In FIG. 6, a cellular phone 21 is to be connected to a route server 24 via a telecommunication base station 22, or a public network or the Internet 23, and transmits data included in the destination information pattern.

Here, a communication method with the server via the network can be based on either a generic protocol, such as HTTP (Hyper Text Transfer Protocol), or a special one.

The route server 24 which has received the requirement of destination information sends back the route information to the cellular phone 21 depending on the identifier attached to a URL inputted from the cellular phone 21. The route information can be a package of either one sort of destination information or a plurality of sorts of destination information. For example, in the case of a pattern printed on the poster, which is advertising "Autumn Kyoto Tour—the first release, organized by East Japan Railway Company", an identifier acquired from the pattern may be a sequence of characters, such as "JRE-Atm-Kyoto-1st". The route server 24 having the identifier transmitted as a character sequence, that is, "JRE-Atm-Kyoto-1st", determines it as "Autumn Kyoto Tour—the first release, organized by East Japan Railway Company", and sends back the route information to the cellular phone 21.

With reference to FIG. 5B, in step 5-1b of FIG. 5B, the cellular phone 21, having a reply from the route server 24, displays candidates of the route on the display device 7 (step 5-2b). A user of the cellular phone 21 selects a desired item among the itemized content of the route selection which is shown in FIG. 7A.

The selected item may further include items shown in FIG. 7B. Thus, the user ultimately selects the destination (step 5-3b). Next, the user sets destination information (latitude, longitude, and address) (step 5-4b). Then, positioning by use of GPS (A-GPS) starts and navigation will follow (step 5-5b).

Here, it is assumed that the destination information is acquired from the route server 24 or the information has already been included in the route information initially acquired.

With such a cellular phone equipped with the navigation function, it is made possible for a user to enjoy efficiently a sightseeing tour, since the user can easily get to the sightseeing spot.

The present invention helps service providers and who are to provide sightseeing tours, thereby attract many tourists inducing to their locations.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A portable communication terminal equipped with a camera, said portable communication terminal comprising:
   GPS signal processing means for outputting present position information of said portable communication terminal;
   destination information detection means for detecting destination information from a picture taken by said camera; and navigation means for performing navigation based on said destination information and said present position information.

2. A portable communication terminal according to claim 1, wherein said destination information includes position information of said destination.

3. A portable communication terminal according to claim 1, wherein said destination information is expressed in a pattern.

4. A portable communication terminal according to claim 3, wherein said pattern comprises a barcode.

5. A portable communication terminal according to claim 1, wherein
said destination information comprises an identifier identifying said destination,
said terminal further comprising:
identifier transmitting means for transmitting said identifier to a route server;
destination location information receiving means for receiving destination location information corresponding to said identifier from said route server;
and wherein said navigation means performs navigation based on said destination position information and said present position information.

6. A portable communication terminal according to claim 5, wherein said destination information in said picture is expressed by a pattern specifying the destination.

7. A portable communication terminal according to claim 6, wherein said pattern comprises a barcode.

8. A portable communication terminal according to claim 1, wherein said navigation based on said destination information and said present position information comprises navigation from said present position to said destination, said destination being different from said present position.

9. A portable communication terminal according to claim 1, wherein said destination information comprises a position different from said present position of said portable communication terminal at a time said picture is taken.

10. A portable communication terminal according to claim 1, wherein visual image contents of said picture comprise said destination information.

* * * * *